United States Patent
Baxter et al.

(10) Patent No.: US 8,007,698 B2
(45) Date of Patent: Aug. 30, 2011

(54) WOOD COMPOSITES BONDED WITH PHENOL-FORMALDEHYDE BY STEAM INJECTION PRESSING

(75) Inventors: Paul S. Baxter, Conyers, GA (US); Robert A. Breyer, Tucker, GA (US); Melissa J. Cannon, Ellenwood, GA (US); John D. Cothran, Conyers, GA (US); Jessica D. Jennings, Social Circle, GA (US); James H. Knight, Conyers, GA (US); Herman D. Watts, Jr., McDonough, GA (US); Daniel C. Yeager, Smyrna, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 92 days.

(21) Appl. No.: 12/683,475

(22) Filed: Jan. 7, 2010

(65) Prior Publication Data

US 2010/0171233 A1    Jul. 8, 2010

Related U.S. Application Data

(60) Provisional application No. 61/143,017, filed on Jan. 7, 2009.

(51) Int. Cl.
*B27N 3/12*    (2006.01)

(52) U.S. Cl. .......................... 264/83; 264/109; 264/122

(58) Field of Classification Search .................. None
See application file for complete search history.

(56) References Cited

U.S. PATENT DOCUMENTS

| | | | | |
|---|---|---|---|---|
| 3,968,308 A | * | 7/1976 | Buschfeld et al. | 428/402 |
| 4,393,019 A | * | 7/1983 | Geimer | 264/83 |
| 4,850,849 A | * | 7/1989 | Hsu | 425/407 |
| 4,937,024 A | * | 6/1990 | Hickson | 264/83 |
| 5,217,665 A | * | 6/1993 | Lim et al. | 264/83 |
| 6,132,656 A | * | 10/2000 | Dodd | 264/83 |
| 6,187,234 B1 | * | 2/2001 | Bonomo et al. | 264/83 |
| 6,432,254 B1 | * | 8/2002 | Black et al. | 156/307.5 |

* cited by examiner

*Primary Examiner* — Mary F Theisen
(74) *Attorney, Agent, or Firm* — Michael S. Kerns

(57) ABSTRACT

The present invention relates to a method for preparing a wood composite, and the related wood composite itself formed by steam injection pressing using a phenol-formaldehyde resin binder composition capable of rapidly curing in a saturated or superheated steam atmosphere.

13 Claims, No Drawings

US 8,007,698 B2

WOOD COMPOSITES BONDED WITH PHENOL-FORMALDEHYDE BY STEAM INJECTION PRESSING

FIELD OF THE INVENTION

The present invention is directed to method of preparing a wood composite, and the related wood composite itself formed by steam injection pressing using a phenol-formaldehyde resin binder composition capable of rapidly curing in a saturated or superheated steam atmosphere.

BACKGROUND OF THE INVENTION

Wood-resin composite products, such as plywood, laminated veneer lumber (LVL), oriented strand lumber (OSL), oriented strand board (OSB), particleboard, medium density fiber board, hardboard and the like, traditionally have been made by combining a binder resin with wood components to form a stack or mat which is then consolidated in a hot platen press to cure the binder resin. The hot pressing process generally relies on a combination of conductive and convective heat flow emanating from the press platens to provide the necessary heat to cure the resin. The transfer of heat to the wood-resin composite by conductive and convective heat flow becomes increasing less effective as the thickness of the wood-resin composite being manufactured increases.

In an effort to produce thicker wood-resin composites more effectively, especially from wood pieces such as wood stands, chips, fibers or flakes, manufacturers have turned to hot presses that use saturated steam as the primary heat transfer medium. When saturated steam is introduced directly into the wood-resin composite (known as steam injection pressing), steam rapidly and directly heats the composite through its entire thickness, in part by some of the steam condensing on the pieces of wood and thus giving up its latent heat of condensation. Since the condensation and thus the heating takes place throughout the composite, resin curing occurs rapidly even with thick composites.

While the injection of steam into the wood composite during hot pressing greatly improves the rate of heating, the increased moisture load resulting from the condensed steam has limited the range of resin chemistries that have been successfully commercialized using this technology. In particular, polymethylene diphenyl diisocyanate binders (pMDIs) have been the mainstay for making wood composites by steam injection pressing, while condensation resins, and particularly phenol-formaldehyde resins, have yet to enjoy wide acceptance for this market. This is unfortunate as phenol-formaldehyde resins are known to provide cost-effective, strong, highly durable bonds with wood components made by conventional hot platen pressing techniques. Thus, the development of a way to use a phenol-formaldehyde binder resin successfully for making commercially acceptable wood composites by steam injection pressing would have significant value.

SUMMARY OF THE INVENTION

In one embodiment, the present invention is directed to a method for preparing a wood composite by steam injection pressing of a mixture of wood pieces and binder using phenol-formaldehyde resin as binder characterized in that (1) from 80 to 20 percent by weight of the phenol-formaldehyde resin is supplied as an aqueous composition prepared at a formaldehyde to phenol mole ratio (F:P) in the range of 2.15:1 to 2.65:1, the phenol-formaldehyde resin supplied as the aqueous composition having a weight average molecular weight in a range of 2000 to 8000; (2) from 20 to 80 percent by weight of the phenol-formaldehyde resin is supplied as particulate solids with a mole ratio of formaldehyde to phenol (F:P) in the phenol-formaldehyde resin particulate solids in the range of 2.1:1 to 2.6:1, the phenol-formaldehyde resin supplied as particulate solids having a weight average molecular weight in a range of 1500 to 4500 and (3) steam is injected into the mixture of wood pieces and binder during formation of the wood composite at a maximum pressure within a range of 15 to 95 psig.

In one embodiment, the present invention is directed to a method for preparing a wood composite by steam injection pressing comprising:

forming a mat comprising wood pieces having applied thereto (A) an aqueous phenol-formaldehyde resin composition in an amount of 0.2 to 8 percent by weight of phenol-formaldehyde resin solids per oven dry weight of the wood pieces, the phenol-formaldehyde resin in the aqueous phenol-formaldehyde resin composition having been prepared at a formaldehyde to phenol mole ratio (F:P) in the range of 2.15:1 to 2.65:1 and having a weight average molecular weight in a range of 2000 to 8000 and (B) a solid particulate phenol-formaldehyde resin in an amount of 0.2 to 8 percent by weight of solid particulate phenol-formaldehyde resin solids per oven dry weight of the wood pieces, the solid particulate phenol-formaldehyde resin having a mole ratio of formaldehyde to phenol (F:P) in the range of 2.2:1 to 2.6:1 and having a weight average molecular weight in a range of 1500 to 4500, with the total amount of phenol-formaldehyde resin solids constituting 1 to 12 percent by weight of the oven dry weight of the wood pieces;

consolidating the mat of wood pieces having the applied phenol-formaldehyde resin in a steam injection press;

supplying a quantity of steam to the mat being consolidated in the steam injection press, the steam being supplied at a maximum pressure within the range of 15 to 95 psig and for a period of time sufficient to cure the phenol-formaldehyde resin.

In one embodiment, the present invention is directed to a method for preparing a wood composite by steam injection pressing comprising:

forming a mat comprising wood pieces having applied thereto (A) an aqueous phenol-formaldehyde resin composition in an amount of 0.2 to 8 percent by weight of phenol-formaldehyde resin solids per oven dry weight of the wood pieces, the phenol-formaldehyde resin in the aqueous phenol-formaldehyde resin composition having been prepared at a formaldehyde to phenol mole ratio (F:P) in the range of 2.15:1 to 2.65:1 and having a weight average molecular weight in a range of 2000 to 8000 and (B) a solid particulate phenol-formaldehyde resin in an amount of 0.2 to 8 percent by weight of solid particulate phenol-formaldehyde resin solids per oven dry weight of the wood pieces, the solid particulate phenol-formaldehyde resin having a mole ratio of formaldehyde to phenol (F:P) in the range of 2.1:1 to 2.6:1 and having a weight average molecular weight in a range of 1500 to 4500, with the total amount of phenol-formaldehyde resin solids constituting 1 to 12 percent by weight of the oven dry weight of the wood pieces;

consolidating the mat of wood pieces having the applied phenol-formaldehyde in a steam injection press having first and second opposing press platens;

supplying a first quantity of steam to the mat being consolidated in the steam injection press through the first press platen while withdrawing steam through the opposing second press platen, the steam being supplied at a maximum pressure within the range of 15 to 95 psig;

supplying a second quantity of steam to the mat being consolidated in the steam injection press through the opposing second press platen while withdrawing steam through the first press platen, the steam being supplied at a maximum pressure within the range of 15 to 95 psig;

supplying a third quantity of steam to the mat being consolidated in the steam injection press, preferably simultaneously, through both the first and second opposing press platens, the steam being supplied at a maximum pressure within the range of 15 to 95 psig and for a period of time sufficient to cure the phenol-formaldehyde resin.

DETAILED DESCRIPTION OF THE INVENTION

The present invention is directed to a method for preparing a wood composite by steam injection pressing using phenol-formaldehyde resin as a binder. According to the method, one portion of the phenol-formaldehyde resin is supplied as an aqueous composition and another portion of the phenol-formaldehyde resin is supplied as particulate solids.

The present invention has particular utility in the preparation of wood composites made from wood (lignocellulosic) pieces (such as wood stands, wood chips, wood flakes, or wood fibers). Consolidated mats made with such wood pieces are steam permeable and thus readily cured by steam injection. Wood composite products that can be made using the method of the present invention particularly include: oriented strand board (OSB), oriented strand lumber (OSL), medium density fiberboard (MDF), Paralam®, hardboard, waferboard, chipboard, particleboard, flakeboard and the like.

Consolidated wood composites of high internal bond strengths are formed in accordance with the method of the present invention by a combination of pressurized steam injection, platen heat and platen pressure. Internal bond strengths above 100 psi are readily achievable.

The present invention has particular utility in the preparation of wood composites having a thickness of at least ¼ inch, usually at least 7/16 inch, often up to 3½ inches and possibly up to 6 inches or more.

As noted, the two required components of the binder are an aqueous phenol-formaldehyde resin composition and a solid, particulate phenol-formaldehyde resin composition.

An aqueous phenol-formaldehyde resin composition useful in accordance with the present invention is a phenol-formaldehyde resin prepared under aqueous reaction conditions at a formaldehyde to phenol mole ratio (F:P) in the range of 2.15:1 to 2.65:1 (usually 2.25:1 to 2.65:1) and having a weight average molecular weight in a range of 2000 to 8000. A particularly suitable aqueous phenol-formaldehyde resin can be made at a formaldehyde:phenol (F:P) mole ratio in the range of about 2.35:1 to 2.5:1.

A suitable aqueous phenol-formaldehyde resin composition can be produced by reacting phenol and formaldehyde in water under an alkaline condition so as to yield a phenol-formaldehyde resole resin having a weight average molecular weight of between about 2000 and 8000, preferably between 3000 and 5000. Suitable methods for synthesizing an aqueous phenol-formaldehyde resole resin composition include both single step batch processes, or "programmed" processes (i.e., staged addition). In its broadest aspects, the present invention is not limited to any particular way for making the aqueous phenol-formaldehyde resin composition.

The aqueous phenol-formaldehyde resole resin used in this invention typically has a resin solids content of about 25% to 75% by weight, usually from about 30% to 60% solids by weight.

Conveniently, a batch process can be used to synthesize a suitable aqueous phenol-formaldehyde resole resin composition by single-stage alkaline condensation of phenol and formaldehyde under a vacuum reflux at a temperature between 60 and 100° C., usually above 70° C., and often above 80° C. In accordance with the present invention, the molar ratio of formaldehyde to phenol for making the aqueous phenol-formaldehyde resin composition is in the range of 2.15:1 to 2.65:1 (usually 2.25:1 to 2.65:1), preferably in the range of 2.35 to 2.50.

A phenol-formaldehyde resole resin can be further modified by the post addition of caustic.

When preparing an aqueous phenol-formaldehyde resole resin composition, an alkaline catalyst is used to promote the reaction of formaldehyde with phenol. The catalyst is usually one of the inorganic or organic alkaline catalysts known to be useful in preparing phenol-formaldehyde resole resins. Typical catalysts include alkali metal hydroxides, such as sodium hydroxide, lithium hydroxide, potassium hydroxide, or mixtures thereof. Generally sodium hydroxide is used based on its cost, availability and suitability. Other catalysts include alkali metal carbonates such as sodium carbonate and potassium carbonate, alkaline earth metal hydroxides such as magnesium hydroxide, calcium hydroxide and barium hydroxide, and organic amines. The catalyst usually is used in a low but effective amount to catalyze the reaction.

As noted, an aqueous phenol-formaldehyde resole resin can also be prepared using staged addition processes. Methods for preparing phenol-formaldehyde resin by staged addition are known. When preparing the aqueous phenol-formaldehyde resole resin in this way, formaldehyde can be gradually added to the phenol, and/or phenol can be gradually added to formaldehyde and/or the alkaline catalyst can be gradually added to a mixture of formaldehyde and phenol to promote a controlled polymerization.

In any of these synthesis processes (and in the preparation of the solid phenol-formaldehyde component), the phenol-formaldehyde resin may be prepared using reactants that are commercially available in many forms. Formaldehyde is available as paraformaldehyde (a solid, polymerized formaldehyde) and more conveniently as formalin solutions (aqueous solutions of formaldehyde, sometimes with methanol, usually in 37%, 44%, or 50% formaldehyde concentrations). Formaldehyde also may be available as a gas. In the broad practice of the present invention, any of these forms may be suitable. Further, in some circumstances the formaldehyde may be partially replaced with other suitable aldehydes, such as acetaldehyde or furaldehyde, as known in the wood composite art. Typically, a formalin solution low in methanol is used as the formaldehyde source.

Phenol used for making phenol-formaldehyde resins for the binder used in accordance with the present invention may be replaced, partially or totally in some cases, with other phenolic compounds un-substituted at either the two ortho positions or at one ortho and the para position. These unsubstituted positions are necessary for the desired polymerization reaction(s) to occur. Other phenol compounds substituted in these positions may be used in lesser quantities (e.g., up to about 10 weight % of the phenol) as it is known in the art to control molecular weight by a chain termination reaction using such phenolic compounds. Any one, all, or none of the remaining carbon atoms of the phenol ring can be substituted in a conventional fashion. The nature of the substituents can vary widely, and it is only necessary that the substituent not interfere in the polymerization of the aldehyde with the phenol at the ortho and/or para positions. Substituted phenols which optionally can be employed in the formation of the phenol-formaldehyde resole resin include alkyl substituted phenols, aryl substituted phenols, cycloalkyl substituted phenols, alkenyl substituted phenols, alkoxy substituted phenols, aryloxy substituted phenols, and halogen substituted phenols, the foregoing substituents possibly containing from 1 to 26, and usually from 1 to 9, carbon atoms.

Specific examples of suitable phenolic compounds for replacing a portion or all of the phenol used in preparing the phenol-formaldehyde resin compositions used in the present invention include: bis-phenol A, bis-phenol F, o-cresol, m-cresol, p-cresol, 3, 5-5 xylenol, 3,4-xylenol, 3,4,5-trimethylphenol, 3-ethyl phenol, 3,5-diethyl phenol, p-butyl phenol, 3,5-dibutyl phenol, p-amyl phenol, p-cyclohexyl phenol, p-octyl phenol, 3,5 dicyclohexyl phenol, p-phenyl phenol, p-phenol, 3,5-dimethoxy phenol, 3,4,5 trimethoxy phenol, p-ethoxy phenol, p-butoxy phenol, 3-methyl-4-methoxy phenol, p-phenoxy phenol, naphthol, anthranol and substituted derivatives thereof.

The aqueous phenol-formaldehyde resin composition, e.g., resole resin composition, usually has an alkalinity, i.e., contains a base, in the range of 0.5% to about 15%, more usually in the range of 1% to 12%, and particularly in the range of 2% to 8%, based on the weight of the aqueous resin composition, when the base is sodium hydroxide. If a different base is used, the alkalinity content should be proportioned to be equivalent on a molar weight basis to the above noted range based on sodium hydroxide. For example, to attain the equivalent of an alkalinity of 6% sodium hydroxide, i.e., 6 grams of sodium hydroxide in 100 grams of aqueous resin, about 8.4 grams of potassium hydroxide in 100 grams of the resin solution would be required. The base may be an alkali metal or alkaline earth metal compound such as a hydroxide, a carbonate, or an oxide.

In addition to the aqueous phenol-formaldehyde resin composition, the binder of the present invention also includes a solid particulate phenol-formaldehyde resin. The solid particulate phenol-formaldehyde resin can be any powdered, granular, flake, chipped, spray dried, freeze dried, ground, or other thermosetting phenol formaldehyde resin composition powder or solid. Thus, both novalac and resole resins can be used as the solid particulate phenol-formaldehyde resin. The solid particulate phenol-formaldehyde resin composition has a mole ratio of formaldehyde to phenol (F:P) in the range of 2.1:1 to 2.6:1 (usually 2.2:1 to 2.6:1) and has a weight average molecular weight in a range of 1500 to 4500.

Novolac resins are generally synthesized using an acid-type catalyst at formaldehyde:phenol mole ratios of 0.7:1 to 1:1. When using a novolac resin in the present invention it is mixed with hexamethylenetetramine (or an alternative formaldehyde source) so that the resin composition is thermosetting with an effective mole ratio of formaldehyde to phenol (F:P) in the range of 2.1:1 to 2.6:1 (usually 2.2:1 to 2.6:1).

Usually, the solid particulate (e.g., powdered) phenol-formaldehyde resin is a dried version, such as a spray dried version, of an aqueous phenol-formaldehyde resin composition, such as a resole resin that might otherwise be suitable for use as the aqueous component of the binder. Thus, it may be made at the same or similar phenol-formaldehyde mole ratio and under the same or similar alkaline reaction condition and thus may have a similar molecular weight. More particularly, a phenol-formaldehyde resin suitable as the particulate or powdered component a mole ratio of formaldehyde to phenol (F:P) in the range of 2.1:1 to 2.6:1, often in the range of 2.2:1 to 2.6:1, usually a P:F mole ratio in the range of 2.25:1 to 2.6:1 and preferably a P:F mole ratio in the range of 2.3:1 to 2.5:1. A suitable resin can be prepared by reacting phenol and formaldehyde at a P:F mole ratio in the range of 2.1:1 to 2.6:1, often in the range of 2.2:1 to 2.6:1, usually at a P:F mole ratio in the range of 2.25:1 to 2.6:1 and preferably at a P:F mole ratio in the range of 2.3:1 to 2.5:1. Particularly suitable phenol-formaldehyde resins for use as the particulate or powdered component have a weight average molecular weight of 1500 to 4500, more usually 1800 to 4500, more often from 2000 to 4500 and preferably from 2000 to 4000.

Methods for preparing a spray-dried resole resin are well known to those skilled in the art of wood composite binders and a detailed description is unnecessary. Spray drying refers to the technically sophisticated process of atomizing (in the form of finely divided droplets) the aqueous resin into a gas stream (often a heated air stream) under controlled temperature conditions and under specific gas/liquid contacting conditions to effect evaporation of water from the atomized droplets and production of a dry particulate solid product. In the spray drying process, a liquid phenol-aldehyde resin is atomized to fine droplets and mixed with hot air (e.g., 180 to 210° C.) to evaporate the water from the resin droplets. The temperature of the resin is usually close to the boiling water temperature or higher. Spray drying is typically carried out with pressure nozzles (nozzle atomization) or centrifugal atomizers operating at high speeds (e.g., a spinning disc). Despite the high velocity generation of droplets, a spray dryer is designed so that the droplets avoid a much as possible contact with the spray dryer wall under proper operating procedures. This effect is achieved by a precise balance of atomizer velocity, air flow, spray dryer dimensions of height and diameter, and inlet and outlet means to produce a cyclonic flow of gas, e.g., air in the chamber. A pulse atomizer also can be used to produce the small droplets needed to facilitate evaporation of the water. In some cases, it may be desirable to include a flow promoter, such as an aluminosilicate material, in the aqueous dispersion that is processed in a spray dryer simply to facilitate subsequent handling and transport of the spray dried powder (e.g., to avoid clumping).

As understood by those skilled in the art, the weight average molecular weight of a phenol-formaldehyde resin can be determined by gel permeation chromatography (GPC). The suitable GPC method uses tetrahydrofuran as a solvent/diluent and a system of two mixed C chromatographic columns preceding a 500 Angstroms PLgel column, all available from Polymer Laboratories (now part of Varian, Inc.). The column arrangement is calibrated using a range of polystyrene standards. For determining the weight average molecular weight of a particular resin sample, the sample is injected along with polystyrene, such as having a molecular weight of 250,000, and toluene as an internal standard. A Model 759A Absorbance Detector from Applied Biosystems is used to monitor the column output and assist the molecular weight determination. The method of determining the molecular weight of a phenol-formaldehyde resins is well understood by those skilled in the art.

As noted, the aqueous phenol-formaldehyde resin, e.g., a resole resin, used in this invention typically has a resin solids content of about 25% to 75% by weight, usually about 30% to 60% by weight. Generally, the viscosity should be such as to permit the aqueous phenol-formaldehyde resin to be sprayed onto or mixed with the wood pieces, or wood furnish, so as to coat the wood pieces or wood furnish as is conventional in the manufacture of wood composites. Thus, the Brookfield viscosity of the aqueous phenol-formaldehyde resin as applied to the wood pieces will generally vary from 25 to 800 cps. The aqueous phenol-formaldehyde resole resin is applied to the wood pieces to coat them and provide a relatively sticky surface tack to hold the solid particulate phenol-formaldehyde resin on the wood pieces.

The amount of phenol-formaldehyde resin used as a binder for the wood composite will generally depend on the characteristics desired in the final wood composite product. Generally, the amount of binder can vary from about 1 weight percent up to about 12 weight percent of resin solids based on oven dry weight of the wood pieces. Usually, at least 2 percent by weight and no more than about 8 percent by weight should be needed in most cases. While more resin solids than 12 weight percent can be used; a greater amount is not usually cost efficient.

Usually, the aqueous phenol-formaldehyde resole resin composition is used in an amount to provide 0.2 to 8 percent by weight of phenol-formaldehyde resin solids (e.g., resole resin solids) per oven dry weight of the wood pieces, usually 1 to 8 percent by weight. Usually, the solid particulate phenol-formaldehyde resin is used in an amount to provide 0.2 to 8 percent by weight of particulate phenol-formaldehyde resin solids per oven dry weight of the wood pieces, usually 1 to 8 percent by weight. In most cases, from 80 to 20 percent by weight of the phenol-formaldehyde resin solids are supplied as the aqueous composition and conversely from 80 to 20 percent by weight of the phenol-formaldehyde resin solids are supplied as the particulate solids (powdered resin solids).

The aqueous phenol-formaldehyde resin composition (e.g., resole resin composition) and the solid particulate phenol-formaldehyde resin can be applied to the wood pieces in any way that results in a satisfactory distribution of the binder components on the wood pieces. Thus, aqueous phenol-formaldehyde resin composition and the solid particulate phenol-formaldehyde resin can be applied simultaneously, in admixture, or can be applied individually at the same time or in any order. Any of the variety of known liquid and solid application techniques can be used.

As appreciated by those skilled in the art, during the preparation of the wood composite, waxes also can be applied to the wood pieces; wax is commonly applied in order to enhance the moisture resistance of the wood composite.

Regardless of the technique used to apply the binder components to the wood pieces, the resin treated wood material is formed into a mat and positioned within a press adapted or designed for direct steam injection. Such presses have a press cavity defined by opposing press platens. The press platens can be heated and the press is designed to allow steam to be injected into the cavity where the wood composite is formed between the platens. Often the steam is injected through at least one, and usually both of the platens into the press cavity.

While acceptable wood composite product can be obtained using wood pieces having an average moisture content above 10 percent by weight, for most efficient operation, the average moisture content of the wood pieces in the mat entering the steam press (i.e., not considering any moisture introduced by the binder) should not exceed about 9 percent by weight. Usually, the average moisture content of the wood pieces will be between 3 percent and 9 percent by weight.

In steam injection pressing, saturated or superheated steam is introduced into a mat of wood pieces, where the wood pieces have a binder applied thereto. In the present invention, the binder comprises the combination of: (A) an aqueous phenol-formaldehyde resin composition, usually in an amount of 0.2 to 8 percent by weight of phenol-formaldehyde solids per oven dry weight of the wood pieces, the phenol-formaldehyde resin in the aqueous phenol-formaldehyde composition having a weight average molecular weight between about 2000 and 8000, preferably a weight average molecular weight between 3000 and 5000 and (B) a solid particulate phenol-formaldehyde, usually in an amount of 0.2 to 8 percent by weight of particulate phenol-formaldehyde resin solids per oven dry weight of the wood pieces, the total amount of phenol-formaldehyde solids usually constituting 1 to 12 percent by weight of the oven dry weight of the wood pieces. The solid particulate phenol-formaldehyde, usually exhibits a weight average molecular weight between about 1500 to 4500, preferably a weight average molecular weight between 2000 and 4000

In accordance with the method of the present invention, once the mixture of resin treated wood pieces is readied for consolidation, a mat of the mixture is formed in or is introduced into a suitable steam injection press having at least one perforated press platen and steam injection capability. Steam is injected into the mat through the press platen(s) to cure the resin rapidly. Specific apparatus and techniques for forming wood composites by steam injection pressing are disclosed in a variety of prior art patents including U.S. Pat. Nos. 3,280,237; 3,891,738; 4,393,019; 4,517,147; 4,850,849; 4,937,024 (see especially FIG. 1 and col. 3, line 37 to col. 5, line 9); U.S. Pat. Nos. 5,195,428; 6,132,656 (see especially, FIGS. 1, 2 and 3 and col. 6, line 52 to col. 9, line 47); and U.S. Pat. No. 6,318,989, the respective disclosures of which are incorporated herein by reference. Any of these designs, or other designs of steam injections presses may be used in practicing the method of the present invention.

In the process of steam injection pressing, the steam permeates the mat with at least, some of the steam condensing inside the mat. In any event, the steam heats the mat quickly and uniformly to elevated temperatures. The elevated temperatures cause rapid curing of the resin and allow for short pressing cycles. Because of the direct injection of steam, high temperatures are rapidly achieved throughout the entire mat. The steam is applied for a period of time sufficient to cure the phenol-formaldehyde resin and develop a strong internal bond in the wood composite.

The total press time for preparing wood composites in accordance with the present invention is very short. Measured from the onset of initial steaming until the press is opened, the press cycle is usually less than about 120 seconds for a ¾ inch OSB panel, with press times of 75 to 90 seconds typical in such circumstance. For thicker panels, up to about 1½ inches in thickness, the press cycle is expected to be less than about 240 seconds, with press times of 100 to 160 seconds typical in such circumstance.

In the broad practice of the present invention, there are several ways of configuring steam injection presses to control press cycle, steam usage and product properties, and these are achievable with commercial presses such as an open sided press sold by Siempelkamp. One common steam injection pressing system injects the steam into the mat through perforations in the hot platens as the press is being closed. Steam pressure and distribution in the mat may be controlled by the rate of closing and the timing of the steam injection. Air and steam may flow through the mat and out through the edges of the mat. This method generally requires more steam than closed steam injection systems, but has been used in some commercial operations.

In addition to the use of steam injected through the platens, the platens will also usually be heated separately at least in part to prevent an excessive amount of steam condensing on the platens themselves.

The method of the present invention is most advantageously used in connection with a steam injection press in which steam also is injected into the mat through perforations in the hot platens, but the press provides a seal about the top and bottom platens to control the flow of steam in the mat, so-called self-sealing or sealed steam presses.

In one sealed press design, the seal can be formed by a frame on the top platen which compresses the edges of the mat to a sufficiently high density. This press allows for a more controlled injection of the steam. The high density mat edges may be removed subsequently when the board is trimmed. The self-sealing steam injection system also allows higher pressures and temperatures to develop in the mat.

In another sealed press design, the mat is introduced into a chamber that can be closed and pressurized with steam before the press platens are closed. This system allows the use of higher steam pressures and more precise control of steam usage, press cycle and product properties. This steam injection system tends to be more mechanically complex and requires the press platens to be enclosed in a pressure vessel.

After the mat of resin treated wood pieces mat is disposed within the press cavity, the press can be closed to its final position for making a wood composite product of a specific thickness. Once the press is closed and the press hydraulic pressure has increased to a level whereby the press closing force exceeds, by a sufficient safety factor, the opposing forces exerted by mat compression and the maximum expected injected cavity steam pressure, steam injection can be initiated. As understood by those skilled in the use of steam injection presses, the compression of the platens is linked with the steam injection protocol.

The quantity of wood furnish introduced into the press is proportioned so that closing the press to the desired thickness for the wood composite can be accomplished at conventional press platen pressures. Platen pressures between about 100 to 750 psig are typical. Typical press platen temperatures can range from about 135° C. to 230° C. (275° F. to 446° F.), with a press platen temperature in the range of 195° C. to 210° C. (383° F. to 410° F.) being more typical. The maximum injected steam pressure is generally between 15 and 95 psig, corresponding to saturated steam temperatures of 121 to about 168° C. (250 to 335° F.).

Since air trapped in the mat can interfere with a uniform distribution of steam throughout the mat, the present invention also provides an optional method for facilitating uniform distribution of steam through the mat during the steam injection process.

In particular, in an embodiment of the invention, the mat is conditioned for a rapid and uniform cure by a procedure in which steam is injected alternatively through each of the opposing platens of the press. In accordance with this embodiment, steam is initially injected through only one of the two press platens, while simultaneously removing air and steam by a vacuum system through the other of the two press platens. Such pretreatment may usually comprise no more than about 15% of the total time for the press cycle. After treatment of the mat in this way for a suitable period of time though one platen, usually about 5 to 10 seconds, the procedure is reversed and steam is then injected through the other press platen for a suitable period of time, again usually about 5 to 10 seconds, while removing air and steam by a vacuum system through the press platen through which steam was first injected. In this way, any entrapped air is removed from the mat by the steam or by the vacuum system and is vented by suitable valving and control systems, while at the same time pre-heating the mat to an elevated temperature. This pretreatment cycle is designed to remove any entrapped air and pre-heat the mat to an elevated temperature of about 100° C. (212° F.). When employed, the total pretreatment cycle is generally designed to occur over a total time period of less than 25 seconds. Usually, but not necessarily, the two cycles of the pretreatment are of equal duration.

Following this conditioning or pre-heating cycle, steam injection is usually commenced through both platens simultaneously. Again, pressurized steam (maximum pressure of 15 to 95 psig) is used and is applied for a period of time sufficient to cure the phenol-formaldehyde resin binder. As noted above, the duration of steam injection is usually a function of the thickness of the wood composite product. Usually, the actual steam injection portion of the press cycle is about 40-75% of the total cycle time. After consolidation and curing of the binder resin, the sealed press is decompressed, usually under the imposition of a vacuum. The press is opened and the consolidated wood composite is removed from the press.

Wood composites made using the method of the present invention have consistently shown internal bond strengths of 100 psi and higher.

In further embodiments, the present invention is:

1. A method for preparing a wood composite by steam injection pressing of a mixture of wood pieces and binder using phenol-formaldehyde resin as binder characterized in that (1) from 80 to 20 percent by weight of the phenol-formaldehyde resin is supplied as an aqueous composition prepared at a formaldehyde to phenol mole ratio (F:P) in the range of 2.15:1 to 2.65:1, the phenol-formaldehyde resin supplied as the aqueous composition having a weight average molecular weight in a range of 2000 to 8000; (2) from 20 to 80 percent by weight of the phenol-formaldehyde resin is supplied as particulate solids with a mole ratio of formaldehyde to phenol (F:P) in the phenol-formaldehyde resin particulate solids in the range of 2.1:1 to 2.6:1, the phenol-formaldehyde resin supplied as particulate solids having a weight average molecular weight in a range of 1500 to 4500 and (3) steam is injected into the mixture of wood pieces and binder during formation of the wood composite at a maximum pressure within a range of 15 to 95 psig.

2. A method for preparing a wood composite by steam injection pressing using phenol-formaldehyde resin as binder comprising:

forming a mat comprising wood pieces having applied thereto (A) an aqueous phenol-formaldehyde resin composition, prepared at a formaldehyde to phenol mole ratio (F:P) in the range of 2.15:1 to 2.65:1, the phenol-formaldehyde resin supplied as the aqueous composition having a weight average molecular weight in a range of 2000 to 8000 and supplied in an amount of 0.2 to 8 percent by weight of phenol-formaldehyde resin solids per oven dry weight of the wood pieces, and (B) a solid particulate phenol-formaldehyde resin with a mole ratio of formaldehyde to phenol (F:P) in the range of 2.1:1 to 2.6:1, the phenol-formaldehyde resin supplied as particulate solids having a weight average molecular weight in a range of 1500 to 4500 and supplied in an amount of 0.2 to 8 percent by weight of solid particulate phenol-formaldehyde resin solids per oven dry weight of the wood pieces, with the total amount of phenol-formaldehyde resin solids constituting 1 to 12 percent by weight of the oven dry weight of the wood pieces;

consolidating the mat of wood pieces having the applied phenol-formaldehyde resin in a steam injection press;

supplying a quantity of steam to the mat being consolidated in the steam injection press for a period of time sufficient to cure the phenol-formaldehyde resin.

3. A method for preparing a wood composite by steam injection pressing using phenol-formaldehyde resin as binder comprising:

forming a mat comprising wood pieces having applied thereto (A) an aqueous phenol-formaldehyde resin composition, prepared at a formaldehyde to phenol mole ratio (F:P) in the range of 2.15:1 to 2.65:1, the phenol-formaldehyde resin supplied as the aqueous composition having a weight average molecular weight in a range of 2000 to 8000 and supplied in an amount of 0.2 to 8 percent by weight of phenol-formaldehyde resin solids per oven dry weight of the wood pieces, and (B) a solid particulate phenol-formaldehyde resin with a mole ratio of formaldehyde to phenol (F:P) in the range of 2.1:1 to 2.6:1, the phenol-formaldehyde resin supplied as particulate solids having a weight average molecular weight in a range of 1500 to 4500 and supplied in an amount of 0.2 to 8 percent by weight of solid particulate phenol-formaldehyde resin solids per oven dry weight of the wood pieces, with the total amount of phenol-formaldehyde resin solids constituting 1 to 12 percent by weight of the oven dry weight of the wood pieces;

consolidating the mat of wood pieces having the applied phenol-formaldehyde in a steam injection press having first and second opposing press platens;

supplying a first quantity of steam to the mat being consolidated in the steam injection press through the first press platens while withdrawing steam through the opposing second press platen;

supplying a second quantity of steam to the mat being consolidated in the steam injection press through the opposing second press platen while withdrawing steam through the first press platen;

supplying a third quantity of steam to the mat being consolidated in the steam injection press, preferably simultaneously, through both the first and second opposing press platens, the steam being supplied for a period of time sufficient to cure the phenol-formaldehyde resin.

4. A method according to any of the previous embodiments wherein the phenol-formaldehyde resin supplied as the aqueous composition has a weight average molecular weight in a range of 3000 to 5000.

5. A method according to any of the previous embodiments wherein the phenol-formaldehyde resin supplied as the aqueous composition is prepared at a formaldehyde to phenol mole ratio (F:P) in the range of 2.35:1 to 2.5:1.

6. A method according to any of the previous embodiments wherein the phenol-formaldehyde resin supplied as the aqueous composition has a solids content of 25 to 75% by weight.

7. A method according to any of the previous embodiments wherein the phenol-formaldehyde resin supplied as the aqueous composition has a solids content of 30 to 60% by weight.

8. A method according to any of the previous embodiments wherein the phenol-formaldehyde resin supplied as the aqueous composition has an alkalinity of 2 to 8%.

9. A method according to any of the previous embodiments wherein the phenol-formaldehyde resin supplied as particulate solids has a weight average molecular weight in a range of 2000 to 4000.

10. A method according to any of the previous embodiments wherein the phenol-formaldehyde resin supplied as particulate solids has a formaldehyde to phenol mole ratio (F:P) in the range of 2.3:1 to 2.5:1.

11. A method according to any of the previous embodiments wherein the wood pieces have an average moisture content of 3 to 9% by weight.

12. A method according to any of the previous embodiments wherein the phenol-formaldehyde resin supplied as the aqueous composition is a resole resin synthesized under an alkaline reaction condition.

13. A method according to any of the previous embodiments wherein the phenol-formaldehyde resin supplied as particulate solids is a spray-dried resole resin synthesized under an alkaline reaction condition.

The following examples provide illustrative embodiments of the present invention and are not intended as a limitation on the scope of the invention. Unless otherwise indicated, all parts and percentages are by weight.

EXAMPLE 1

Liquid PF Resin

A suitable aqueous phenol-formaldehyde resin can be prepared in the following manner. 23.6 parts by weight (pbw) phenol is mixed with 9 pbw of a 50% by weight aqueous formaldehyde solution in a suitable reaction vessel. An additional 22.5 pbw water is added followed by the slow addition of 4.8 pbw of a 50% by weight aqueous solution of sodium hydroxide. The addition of the caustic catalyst accelerates the reaction and the ensuing exotherm causes the temperature of the reaction mixture to increase to 70° C. Additional formaldehyde solution (27.9 pbw) is added slowly and the temperature continues to increase. The temperature is increased to about 93° C., with added heating if necessary and the reaction is allowed to proceed to a desired viscosity (total reaction time about 50 minutes). Then, the reaction mixture is cooled (83° C.) and additional sodium hydroxide solution is added (3.6 pbw). As the reaction mixture is cooled further (73° C.), another addition of sodium hydroxide solution is made (3.6 pbw). Once a target viscosity is reached (such as U on the Gardiner scale), the reaction mixture is cooled (55° C.) and urea is added (5 pbw) to scavenge residual formaldehyde. The aqueous resin is then cooled to room temperature. The resin exhibits a non-volatile (solids) content of about 45%, and an alkalinity of about 6% (sodium hydroxide).

EXAMPLE 2

Solid PF Resin

A suitable phenol-formaldehyde resin for making the spray-dried resin powder can be prepared in the following manner. A mixture of 26.7 parts by weight (pbw) phenol and 15 pbw water is heated to about 65° C. About 0.5 pbw lime (5 weight percent moisture) and 7 pbw of a 50% by weight aqueous solution of formaldehyde are sequentially added and the ensuing exotherm causes the temperature of the reaction mixture to increase to 80° C. Thereafter, 2.8 pbw of a 50% by weight aqueous solution of sodium hydroxide, and 13.4 pbw of additional formaldehyde solution are added. The temperature is increased to reflux (100° C.), with added heating if necessary and the reaction is allowed to proceed to a desired viscosity (total reaction time about 95 minutes). Then, the reaction mixture is cooled (88° C.) and additional sodium hydroxide solution is slowly added (5.3 pbw) and the reaction is allowed to proceed to a desired viscosity (e.g., Gardiner XY). As the reaction mixture is cooled further (70° C.), another addition of formaldehyde solution is made (21.3 pbw) and the reaction is allowed to proceed to a desired viscosity (such as W on the Gardiner scale). Then, 2.5 pbw urea and 5 pbw water are added (with heating as needed to maintain the temperature at 70° C.). Once a target viscosity is reached (such as TU on the Gardiner scale), the reaction mixture is cooled (43° C.) and aqueous ammonia (28% by weight) is added (0.7 pbw) and the aqueous resin is then cooled to room temperature. The resin exhibits a non-volatile (solids) content of about 46-47%, and an alkalinity of about 4.7% (sodium hydroxide). The resin solution is then spray dried to produce the resin powder.

EXAMPLE 3

Preparation of Wood Composites

Wood composites can be made with a Dieffenbacher 450-ton laboratory press equipped with 36 inch by 36 inch ventilated platens. The platens are heated using hot oil (in the tests the platens can be heated to a temperature of about 204° F.) and both the top and bottom platens are adapted for both steam injection and vacuum ventilation. The press hydraulics and the steam injection/vacuum ventilation system are operated using a Pressman® control system.

Mats of binder-treated wood pieces are inserted into the press between screens. A ¼ inch by 1 inch mat ring (24 inch square) is placed on the top of the mat beneath the top screen to increase panel edge density and minimize edge effects.

Wood composites are prepared using nominal 3 inch pine flakes dried to an average moisture content of about 3-9% by weight and pre-treated with 1.5% by weight (on the basis of the oven dried weight of the wood flakes) of a molten slack wax.

The binder resin components are applied to the wax-treated wood flakes using a lab blender, the aqueous phenol-formaldehyde resole resin composition is used in an amount to provide 3 percent by weight of phenol-formaldehyde resin solids (e.g., resole resin solids) per oven dry weight of the wood pieces. The solid particulate phenol-formaldehyde resin is used in an amount to provide 3 percent by weight of particulate phenol-formaldehyde resin solids per oven dry weight of the wood pieces. Single layer non-oriented mats are formed and sandwiched between two metal screens for loading into the press.

Following the loading of the mat into the press, press closure is initiated and low pressure steam pre-heating is started when the hydraulic pressure on the mat reaches 50 psi. Initial steam preheat (30 psig saturated steam) from the top platen for nine (9) seconds (with vacuum withdrawal through the bottom platen) is followed by steam preheat (30 psig saturated steam) from the bottom platen for nine (9) seconds (with vacuum withdrawal through the top platen). After the preheat cycle, full steam (60 psig saturated steam) is supplied for 40 seconds through both platens. Vacuum is applied during the 20 seconds of press decompression. The total press cycle was 140 seconds.

1½ inch thick panels (24 inch square) are pressed to a 44 pound per cubic foot target density. The panels are trimmed (and in some cases the surface layer of the panels are planed to remove a pre-cured surface layer) and are tested for Internal Bond (IB), two-hour boil Internal Bond (BIB). Sixteen specimens (2 inch by 2 inch) are typically cut from each panel for the IB and BIB testing.

Wood composites were prepared in accordance with the above-described procedures using phenol-formaldehyde resins in accordance with the following Table 1.

TABLE 1

| Wood Composite | Aqueous P-F Resin | Powdered P-F Resin |
|---|---|---|
| A | 1 | I |
| B | 1 | II |
| C | 2 | I |
| D | 3 | I |
| E | 4 | I |
| F | 5 | I |
| G | 6 | I |
| H | 2 | II |
| I | 6 | II |
| J | 7 | II |

Aqueous P-F resin 1 was made at a P:F ratio of 2.45:1, had an alkalinity of 7% and was believed to have a weight average molecular weight in the range of 2000 to 8000. Aqueous P-F resin 2 was made at a P:F ratio of 2.25:1, had an alkalinity of 4% and was believed to have a weight average molecular weight in the range of 2000 to 8000. Aqueous P-F resin 3 also was made at a P:F ratio of 2.25:1, had an alkalinity of 6% and was believed to have a weight average molecular weight in the range of 2000 to 8000. Aqueous P-F resin 4 was made at a P:F ratio of 2.35:1, had an alkalinity of 5% and was believed to have a weight average molecular weight in the range of 2000 to 8000. Aqueous P-F resin 5 was made at a P:F ratio of 2.45:1, had an alkalinity of 4% and was believed to have a weight average molecular weight in the range of 2000 to 8000. Aqueous P-F resin 6 was made at a P:F ratio of 2.45:1, had an alkalinity of 6% and was believed to have a weight average molecular weight in the range of 2000 to 8000. Aqueous P-F resin 7 was made at a P:F ratio of 2.45:1, had an alkalinity of 5.63% and was believed to have a weight average molecular weight in the range of 2000 to 8000.

Both of the P-F resin powders had a P:F ratio of 2.2:1 and was believed to have a weight average molecular weight in the range of 1500 to 4500. Powdered P-F resin I was believed to have a higher molecular weight than P-F resin II.

The testing results were as follows:

TABLE 2

Internal Bond of Original Samples

| Composite | Average IB (psi) | Std. Error | −95.00% | +95.00% | No. of Samples |
|---|---|---|---|---|---|
| A | 68.2. | 5.5 | 57.4 | 79.0 | 16 |
| B | 114.4 | 5.5 | 103.7 | 125.2 | 16 |
| C | 94.7 | 3.9 | 87.1 | 102.3 | 32 |
| D | 93.6 | 3.9 | 86.0 | 101.2 | 32 |
| E | 95.2 | 3.9 | 87.6 | 102.9 | 32 |
| F | 102.3 | 3.9 | 94.7 | 109.9 | 32 |
| G | 92.7 | 3.9 | 85.1 | 100.4 | 32 |
| H | 94.1 | 5.5 | 83.3 | 104.9 | 16 |
| I | 96.2 | 5.5 | 85.4 | 107.0 | 16 |
| J | 102.8 | 5.5 | 92.1 | 113.6 | 16 |

TABLE 3

Internal Bond of Planed Samples

| Composite | Average IB (psi) | Std. Error | −95.00% | +95.00% | No. of Samples |
|---|---|---|---|---|---|
| A | 113.1 | 3.7 | 105.9 | 120.4 | 32 |
| B | 113.3 | 3.7 | 106.0 | 120.5 | 32 |
| C | 137.8 | 2.6 | 1332.7 | 142.9 | 64 |
| D | 129.6 | 2.6 | 124.5 | 134.8 | 64 |
| E | 131.1 | 2.6 | 126.0 | 136.2 | 64 |

TABLE 3-continued

Internal Bond of Planed Samples

| Composite | Average IB (psi) | Std. Error | −95.00% | +95.00% | No. of Samples |
|---|---|---|---|---|---|
| F | 130.9 | 2.6 | 125.8 | 136.0 | 64 |
| G | 134.8 | 2.6 | 129.7 | 139.9 | 64 |
| H | 127.7 | 3.7 | 120.4 | 134.9 | 32 |
| I | 113.0 | 3.7 | 105.6 | 120.3 | 31 |
| J | 115.5 | 3.7 | 108.2 | 122.7 | 32 |

TABLE 4

2-Hour Boil Internal Bond

| Composite | Average BIB (psi) | Std. Error | −95.00% | +95.00% | No. of Samples |
|---|---|---|---|---|---|
| A | 52.5 | 2.5 | 47.6 | 57.3 | 32 |
| B | 65.8 | 2.5 | 61.0 | 70.7 | 32 |
| C | 63.7 | 1.7 | 60.3 | 67.2 | 64 |
| D | 66.5 | 1.7 | 63.1 | 69.9 | 64 |
| E | 56.7 | 1.7 | 53.3 | 60.1 | 64 |
| F | 59.7 | 1.7 | 56.2 | 63.1 | 64 |
| G | 57.0 | 1.7 | 53.6 | 60.5 | 64 |
| H | 54.0 | 2.5 | 49.1 | 58.8 | 32 |
| I | 68.5 | 2.5 | 63.6 | 73.3 | 32 |
| J | 66.2 | 2.5 | 61.4 | 71.1 | 32 |

The present invention has been described with reference to specific embodiments. However, this application is intended to cover those changes and substitutions that may be made by those skilled in the art without departing from the spirit and the scope of the invention. Unless otherwise specifically indicated, all percentages are by weight. Throughout the specification and in the claims the term "about" is intended to encompass + or −5% and preferably is only about + or −2%.

We claim:

1. A method for preparing a wood composite by steam injection pressing of a mixture of wood pieces and binder using phenol-formaldehyde resin as binder characterized in that (1) from 80 to 20 percent by weight of the phenol-formaldehyde resin is supplied as an aqueous composition prepared at a formaldehyde to phenol mole ratio (F:P) in the range of 2.15:1 to 2.65:1, the phenol-formaldehyde resin supplied as the aqueous composition having a weight average molecular weight in a range of 2000 to 8000; (2) from 20 to 80 percent by weight of the phenol-formaldehyde resin is supplied as particulate solids with a mole ratio of formaldehyde to phenol (F:P) in the phenol-formaldehyde resin particulate solids in the range of 2.1:1 to 2.6:1, the phenol-formaldehyde resin supplied as particulate solids having a weight average molecular weight in a range of 1500 to 4500 and (3) steam is injected into the mixture of wood pieces and binder during formation of the wood composite at a maximum pressure within a range of 15 to 95 psig.

2. A method for preparing a wood composite by steam injection pressing according to claim 1 comprising:
forming a mat comprising wood pieces having applied thereto (A) the aqueous phenol-formaldehyde resin composition in an amount of 0.2 to 8 percent by weight of phenol-formaldehyde resin solids per oven dry weight of the wood pieces, and (B) the solid particulate phenol-formaldehyde resin in an amount of 0.2 to 8 percent by weight of solid particulate phenol-formaldehyde resin solids per oven dry weight of the wood pieces, with the total amount of phenol-formaldehyde resin solids constituting 1 to 12 percent by weight of the oven dry weight of the wood pieces;
consolidating the mat of wood pieces having the applied phenol-formaldehyde resin in a steam injection press;
supplying a quantity of steam to the mat being consolidated in the steam injection press for a period of time sufficient to cure the phenol-formaldehyde resin.

3. A method for preparing a wood composite by steam injection pressing according to claim 1 comprising:
forming a mat comprising wood pieces having applied thereto (A) the aqueous phenol-formaldehyde resin composition in an amount of 0.2 to 8 percent by weight of phenol-formaldehyde resin solids per oven dry weight of the wood pieces, and (B) the solid particulate phenol-formaldehyde resin in an amount of 0.2 to 8 percent by weight of solid particulate phenol-formaldehyde resin solids per oven dry weight of the wood pieces, with the total amount of phenol-formaldehyde resin solids constituting 1 to 12 percent by weight of the oven dry weight of the wood pieces;
consolidating the mat of wood pieces having the applied phenol-formaldehyde in a steam injection press having first and second opposing press platens;
supplying a first quantity of steam to the mat being consolidated in the steam injection press through the first press platens while withdrawing steam through the opposing second press platen;
supplying a second quantity of steam to the mat being consolidated in the steam injection press through the opposing second press platen while withdrawing steam through the first press platen;
supplying a third quantity of steam to the mat being consolidated in the steam injection press, preferably simultaneously, through both the first and second opposing press platens, the steam being supplied for a period of time sufficient to cure the phenol-formaldehyde resin.

4. The method of claim 1 wherein the phenol-formaldehyde resin supplied as the aqueous composition has a weight average molecular weight in a range of 3000 to 5000.

5. The method of claim 1 wherein the phenol-formaldehyde resin supplied as the aqueous composition is prepared at a formaldehyde to phenol mole ratio (F:P) in the range of 2.35:1 to 2.5:1.

6. The method of claim 1 wherein the phenol-formaldehyde resin supplied as the aqueous composition has a solids content of 25 to 75% by weight.

7. The method of claim 1 wherein the phenol-formaldehyde resin supplied as the aqueous composition has a solids content of 30 to 60% by weight.

8. The method of claim 1 wherein the phenol-formaldehyde resin supplied as the aqueous composition has an alkalinity of 2 to 8%.

9. The method of claim 1 wherein the phenol-formaldehyde resin supplied as particulate solids has a weight average molecular weight in a range of 2000 to 4000.

10. The method of claim 1 wherein the phenol-formaldehyde resin supplied as particulate solids has a formaldehyde to phenol mole ratio (F:P) in the range of 2.3:1 to 2.5:1.

11. The method of claim 1 wherein the wood pieces have an average moisture content of 3 to 9% by weight.

12. The method of claim 1 wherein the phenol-formaldehyde resin supplied as the aqueous composition is a resole resin synthesized under an alkaline reaction condition.

13. The method of claim 1 wherein the phenol-formaldehyde resin supplied as particulate solids is a spray-dried resole resin synthesized under an alkaline reaction condition.

* * * * *